United States Patent
Saitoh

(10) Patent No.: US 9,595,110 B2
(45) Date of Patent: Mar. 14, 2017

(54) DISPARITY DERIVING APPARATUS, MOVABLE APPARATUS, ROBOT, METHOD OF DERIVING DISPARITY, METHOD OF PRODUCING DISPARITY, PROGRAM, AND STORAGE MEDIUM

(71) Applicant: Kiichiroh Saitoh, Kanagawa (JP)

(72) Inventor: Kiichiroh Saitoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 57 days.

(21) Appl. No.: 14/661,393

(22) Filed: Mar. 18, 2015

(65) Prior Publication Data
US 2015/0269738 A1 Sep. 24, 2015

(30) Foreign Application Priority Data

Mar. 20, 2014 (JP) .................................. 2014-058623
Mar. 16, 2015 (JP) .................................. 2015-051947

(51) Int. Cl.
*G06K 9/00* (2006.01)
*G06T 7/00* (2006.01)
*G01S 17/02* (2006.01)
*G01S 17/93* (2006.01)

(52) U.S. Cl.
CPC .......... *G06T 7/0075* (2013.01); *G01S 17/026* (2013.01); *G01S 17/936* (2013.01);
(Continued)

(58) Field of Classification Search
None
See application file for complete search history.

(56) References Cited

U.S. PATENT DOCUMENTS 8,897,546 B2* 11/2014 Ren ..................... G06T 7/0022
348/42
9,020,242 B2* 4/2015 Bingrong ............. G06T 7/0065
382/154
(Continued)

FOREIGN PATENT DOCUMENTS

EP 2 570 990 A1 3/2013
JP 2006-090896 4/2006
(Continued)

OTHER PUBLICATIONS

Humenberger et al., "A census-based stereo vision using modified semi-global matching and plane fitting to improve matching quality", 2010 IEEE Computer Society Conference on Computer Vision and Pattern Recognition—Workshops, Jun. 13-18, 2010.*
(Continued)

Primary Examiner — Soo Park
(74) Attorney, Agent, or Firm — Oblon, McClelland, Maier & Neustadt

(57) ABSTRACT

A disparity deriving apparatus for deriving disparity of an object based on a captured reference image of the object and a captured comparison image of the object includes a calculator to calculate costs between a first reference area in the reference image and each one of corresponding areas in the comparison image, and costs between a second reference area and each one of corresponding areas corresponding to the second reference area in the comparison image; a synthesizer to synthesize the costs of the first reference area, and the costs of the second reference area as synthesis costs; a deriving unit to derive a disparity value of the object captured in the first reference area based on the synthesized synthesis cost; and an output unit to output the derived disparity value and a specific cost of the first reference area identified by the derived disparity value.

15 Claims, 12 Drawing Sheets

(52) U.S. Cl.
CPC .. *G06T 7/0057* (2013.01); *G06T 2207/10012* (2013.01); *G06T 2207/10028* (2013.01); *G06T 2207/20228* (2013.01); *G06T 2207/30252* (2013.01)

(56) References Cited

U.S. PATENT DOCUMENTS

| | | | |
|---|---|---|---|
| 9,300,946 B2* | 3/2016 | Do | H04N 13/0214 |
| 9,342,916 B2* | 5/2016 | Guseva | G06T 15/00 |
| 2005/0131646 A1 | 6/2005 | Camus | |
| 2009/0195371 A1 | 8/2009 | Camus | |
| 2013/0064443 A1 | 3/2013 | Schlosser et al. | |
| 2013/0135441 A1* | 5/2013 | Deng | G06T 7/0075 |
| | | | 348/47 |
| 2013/0342641 A1 | 12/2013 | Morioka et al. | |
| 2014/0153784 A1* | 6/2014 | Gandolph | G06T 7/0075 |
| | | | 382/107 |
| 2015/0187076 A1* | 7/2015 | Lin | H04N 7/15 |
| | | | 382/103 |
| 2015/0254868 A1* | 9/2015 | Srikanth | G06T 7/0081 |
| | | | 348/47 |

FOREIGN PATENT DOCUMENTS

| | | |
|---|---|---|
| JP | 2012-018014 | 1/2012 |
| JP | 2012-181142 | 9/2012 |

OTHER PUBLICATIONS

Hermann et al., "Iterative semi-global matching for robust driver assistance systems", ACCV 2012.*

Mroz et al., "An empirical comparison of real-time dense stereo approaches for use in the automotive environment", EURASIP Journal on Image and Video Processing 2012.*

Hirschmuller, "Accurate and efficient stereo processing by semi-global matching and mutual information", 2005 IEEE Computer Society Conference on Computer Vision and Pattern Recognition (CVPR'05).*

Extended European Search Report issued Aug. 10, 2015 in Patent Application No. 15160085.5.

Ralf Haeusler, et al., "Evaluation of Stereo Confidence Measures on Synthetic and Recorded Image Data" International Conference on Informatics, Electronics & Vision, XP032259318, May 18, 2012, pp. 963-968.

Atsushi Yamashita, et al., "Removal of Adherent Waterdrops from Images Acquired with Stereo Camera" International Conference on Intelligent Robots and Systems, XP010857199, Aug. 2, 2005, pp. 953-958.

Xiaoyan Hu, et al., "Evaluation of Stereo Confidence Indoors and Outdoors" 2010 IEEE Conference on Computer Vision and Pattern Recognition, XP031725628, Jun. 13, 2010, pp. 1466-1473.

U.S. Appl. No. 14/662,519, filed Mar. 19, 2015.

* cited by examiner

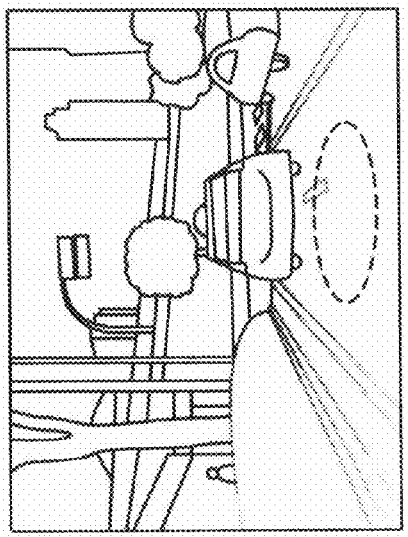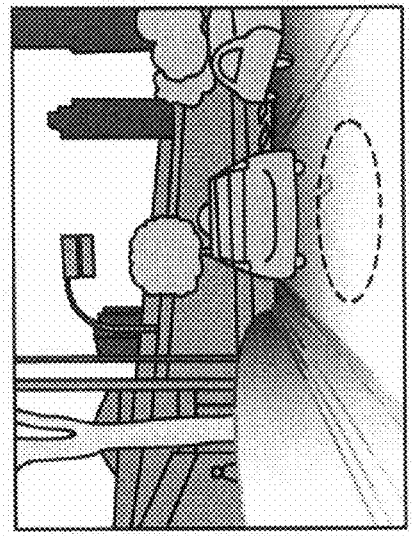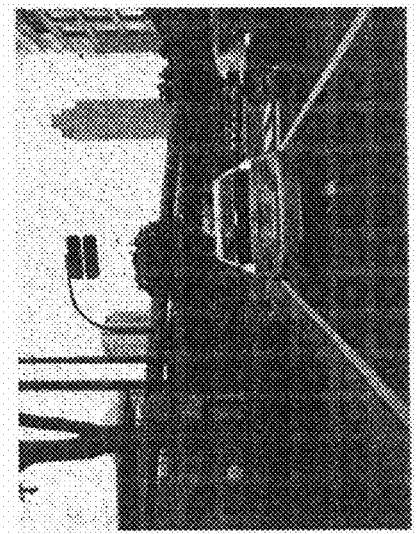

REFERENCE IMAGE

COMPARISON IMAGE

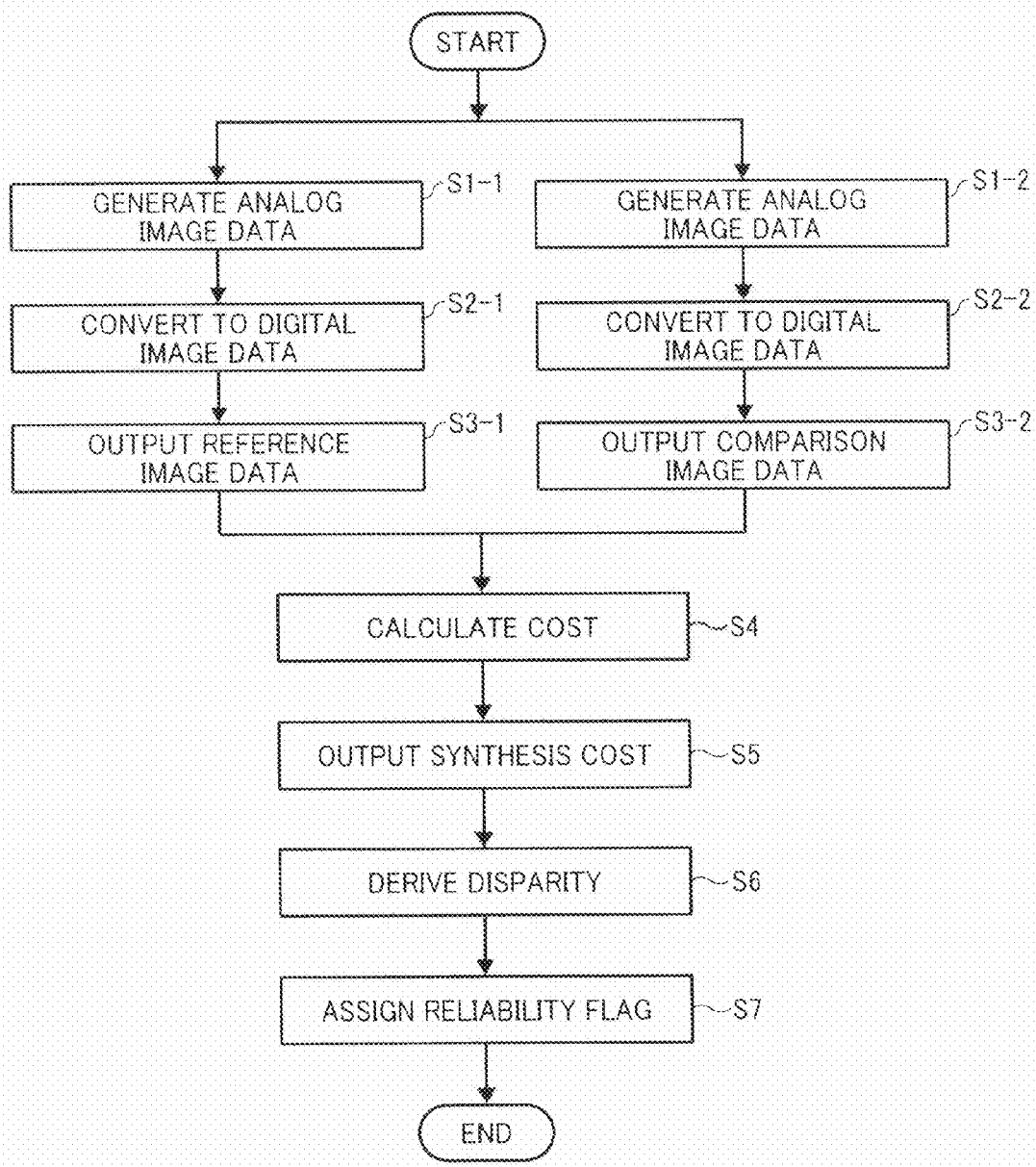

F: RELIABILITY FLAG (1, 0)

DISPARITY DERIVING APPARATUS, MOVABLE APPARATUS, ROBOT, METHOD OF DERIVING DISPARITY, METHOD OF PRODUCING DISPARITY, PROGRAM, AND STORAGE MEDIUM

CROSS-REFERENCE TO RELATED APPLICATION

This application claims priority pursuant to 35 U.S.C. §119(a) to Japanese Patent Application Nos. 2014-058623 filed on Mar. 20, 2014 and 2015-051947 filed on Mar. 16, 2015 in the Japan Patent Office, the disclosures of which are hereby incorporated by reference herein in their entirety.

BACKGROUND

Technical Field

The present invention relates to deriving disparity of an object based on a reference image and a comparison image each obtained by capturing an image of the same object.

Background Art

A range-finding method using disparity information is conventionally known, in which disparity of an object observed by a stereo camera is derived by stereo imaging, and a disparity value indicating this disparity is used to measure the distance from the stereo camera to the object based on the principle of triangulation. With this range-finding method, for example, the distance between two automobiles or between an automobile and obstacles can be measured and utilized for preventing automobile collisions. The range-finding method may be also referred to as the distance measurement method.

Specifically, a stereo matching process is employed for deriving disparity. In the stereo matching process, a reference image is captured by one camera of a stereo camera, composed of two cameras, and a comparison image is captured by the other camera of the stereo camera. Then, by successively shifting a plurality of candidate corresponding pixels in the comparison image relative to one reference pixel set in the reference image, a position of a corresponding pixel having an image signal that is the most similar to an image signal of the reference pixel set in the reference image is identified to derive a disparity value between the reference image and the comparison image. Typically, luminance values of image signals obtained by the two cameras are compared to compute "cost" (hereinafter, cost means "dissimilarity") of the compared luminance values, with which a position of a pixel having the smallest cost is identified. Further, the stereo matching process can employ a block matching process to prevent mismatching, in which luminance at edges in an image where luminance changes greatly are compared.

However, for areas having weak texture (i.e., an area where the magnitude of luminance change of an object is weak) and the features to be extracted are themselves diminished, edge detection may not be effective.

In view of this ineffective edge detection, a method that derives more accurate disparity for an object having weak texture is proposed. In this method, the cost of one reference pixel in a reference image and also the costs of other pixels around the one reference pixel are aggregated to derive disparity for an object having weak texture. With this method, disparity of the entirety of the object can be derived and used not only for range-finding but also classification of the object (e.g., whether the object is a sign or an automobile).

However, in the above mentioned method disclosed in JP-2012-181142-A, an object having weak texture is used for range-finding the same as an object having strong texture is used, despite the disparity of the object having weak texture being less reliable compared to the object having strong texture. Therefore, the distance between a camera at an imaging position and the object having weak texture cannot be measured with high precision, and thus range-finding cannot be performed with high precision.

SUMMARY

In one aspect of the present invention, a disparity deriving apparatus for deriving disparity of an object based on a reference image of the object captured at a first image capturing position and a comparison image of the object captured at a second image capturing position. The disparity deriving apparatus includes a calculator to calculate costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image; a synthesizer to synthesize the costs of the first reference area, and the costs of the second reference area as synthesis costs; a deriving unit to derive a disparity value of the object captured in the first reference area based on the synthesis costs synthesized by the synthesizer; and an output unit to output the disparity value derived by the deriving unit and a specific cost of the first reference area identified by the derived disparity value, the specific cost obtained from the costs calculated for the first reference area by the calculator.

In another aspect of the present invention, a method of deriving disparity of an object based on a reference image of the object captured at a first image capturing position and a comparison image of the object captured at a second image capturing position is devised. The method includes the steps of calculating costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image; synthesizing the costs of the first reference area, and the costs of the second reference area as synthesis costs; deriving a disparity value of the object captured in the first reference area based on the synthesis costs synthesized by the synthesizing step; and outputting the disparity value derived by the deriving step, and a specific cost of the first reference area identified by the disparity value derived by the deriving step, the specific cost obtained from the costs calculated for the first reference area by the calculating step.

In another aspect of the present invention, a non-transitory computer-readable storage medium storing a program that, when executed by a computer, causes the computer to execute a method of deriving disparity of an object based on a reference image of the object captured at a first image capturing position and a comparison image of the object captured at a second image capturing position is devised. The method includes the steps of calculating costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image; synthesizing the costs of the first reference area, and the costs of the second reference area as synthesis costs; deriving a disparity value of the object captured in the first reference area based on the synthesis costs synthesized by the synthesizing step; and outputting the disparity value derived by the deriving step, and a specific cost of the first reference area identified by the disparity value derived by the deriving step, the specific cost obtained from the costs calculated for the first reference area by the calculating step.

In another aspect of the present invention, a disparity deriving apparatus for deriving disparity of an object based on a reference image of the object captured at a first image capturing position and a comparison image of the object captured at a second image capturing position is devised. The disparity deriving apparatus includes a calculator to calculate matching level between a first reference area in the reference image and each one of corresponding areas corresponding to the reference first area in a given region in the comparison image, and matching level between a second reference area, surrounding the first reference area in the reference image, and each one of corresponding areas corresponding to the second reference area in a given region in the comparison image; a synthesizer to synthesize the matching level of the first reference area, and the matching level of the second reference area as a synthesis matching level; a deriving unit to derive a disparity value of the object captured at the first reference area based on the synthesis matching level synthesized by the synthesizer, and to assign first determination information or second determination information to the derived disparity value; and an output unit to output the disparity value derived by the deriving unit to an object recognition apparatus that recognizes an object in the reference image or the comparison image by conducting a first process and a second process based on the derived disparity value. The first process includes a first sub-process that processes a first disparity value determined by the first determination information, and a second sub-process that processes a second disparity value determined by the second determination information, and the second process included a third sub-process that processes the first disparity value, and the second sub-process that processes the second disparity value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2A is an example of a reference image;

FIG. 2B is an example of a high density disparity image generated from the reference image of FIG. 2A;

FIG. 2C is an example of an edge disparity image generated from the reference image of FIG. 2A;

FIG. 11 is a flowchart illustrating operation of disparity computation according to one or more example embodiments;

Figure 1:
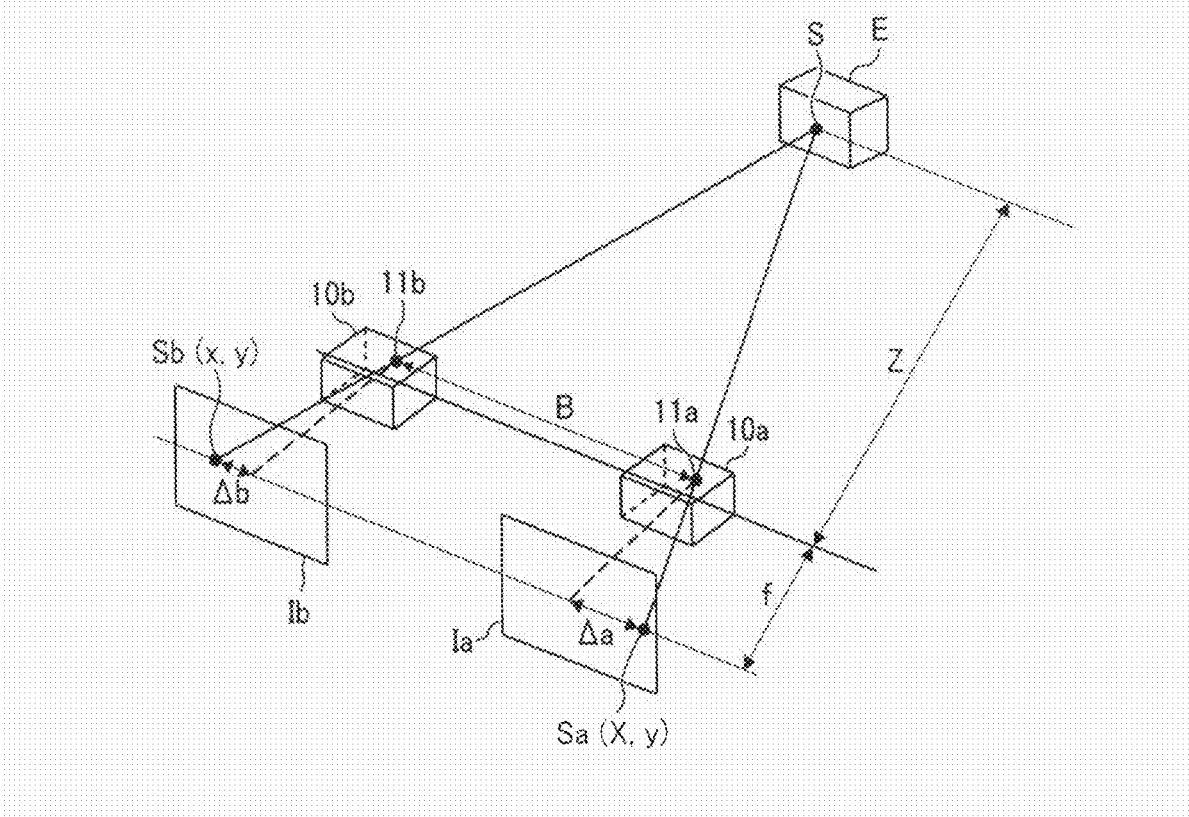
FIG. 1 illustrates the principle of computing the distance from an imaging device to an object.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to one or more example embodiments are described hereinafter.

(Overview of Range-Finding Method Using SGM)

Referring to FIGS. 1 to 6, a description is given of a range-finding method using semi-global matching (SGM). Since SGM is disclosed in "Accurate and Efficient Stereo Processing by Semi-Global Matching and Mutual Information" (author; Hirschmuller, H. Inst. of Robotics & Mechatronics Oberpfaffenhofen, German Aerosp. Center, Wessling, Germany), only a brief explanation of SGM is given below.

Referring to FIG. 1, a description is given of the principle of measuring distance from a stereo camera to an object, in which disparity of the object is derived as a disparity value by conducting stereo imaging using the stereo camera, and the derived disparity value is used to measure the distance from the stereo camera to the object.

FIG. 1 illustrates the principle of computing the distance from the stereo camera used as an imaging device to an object. In the following description, the range-finding process is described based on the units of pixels rather than the units of areas composed of a plurality of pixels for the simplification of description. When the range-finding process is conducted based on the unit of the areas composed of the plurality of pixels, an area including a reference pixel is used as a reference area, and an area including a corresponding pixel, which may correspond to the reference pixel, is used as a corresponding area. Further, the reference area may only be composed of a single reference pixel and the corresponding area may only be composed of a single corresponding pixel.

(Calculation of Disparity)

As illustrated in FIG. 1, the stereo camera includes an imaging device 10a and an imaging device 10b, which are set parallel at the same height in the configuration of FIG. 1. The imaging device 10a and the imaging device 10b capture images of the same object to generate a reference image Ia and a comparison image Ib, respectively. In the configuration of FIG. 1, a point S on the object E in a three-dimensional space is captured at one position of the imaging device 10a and also at one position of the imaging device 10b, wherein these two positions of the imaging device 10a and the imaging device 10b are on the same horizontal line, which means that the point S is captured as a point Sa(X,y) in the reference image Ia and a point Sb(x,y) in the comparison image Ib. In this configuration, a disparity value Δ can be expressed by equation (1) below based on the point Sa(X,y) in the coordinates of the imaging device 10a and the point Sb(x,y) in the coordinates of the imaging device 10b.

$$\Delta = X - x \quad (1)$$

In the configuration of FIG. 1, the disparity value is expressed by Δ=Δa+Δb, wherein Δa is the distance between the point Sa(X,y) in the reference image Ia and the point of intersection of the normal line extending from the imaging lens 11a to the imaging plane, and Δb is the distance between the point Sb(x,y) in the comparison image Ib and the point of intersection of the normal line extending from the imaging lens 11b to the imaging plane.

(Calculation of Distance)

The distance Z between the imaging devices 10a/10b and the object E can be calculated or computed using the disparity value Δ. Specifically, the distance Z is a distance from the plane including the focus position of the imaging lens 11a and the focus position of the imaging lens 11b to the point S on the object E. As illustrated in FIG. 1, the distance Z can be calculated by equation (2) below using the focal length "f" of the imaging lens 11a and the imaging lens 11b, the base line length "B" that is a length between the imaging lens 11a and the imaging lens 11b, and the disparity value Δ.

$$Z = (B \times f)/\Delta \quad (2)$$

As indicated by this equation (2), the greater the disparity value Δ, the smaller the distance Z, and the smaller the disparity value Δ, the greater the distance Z. (SGM)

Referring to FIGS. 2 to 6, a description is given of a range-finding method using SGM.

FIG. 2A is an example of a reference image, FIG. 2B is a conceptual image of a high density disparity image generated from FIG. 2A, and FIG. 2C is a conceptual image of an edge disparity image generated from FIG. 2A, in which the reference image is an image representing one or more objects based on luminance. The high density disparity image is an image derived from the reference image by applying SGM, and represents disparity values at each of coordinates in the reference image. The edge disparity image is an image derived by applying the conventional block matching method, and represents disparity values only at areas having relatively strong texture such as edges in the reference image.

SGM is a method that derives the above described disparity values suitably even if an object having weak texture is detected, and derives the high density disparity image illustrated in FIG. 2B based on the reference image of FIG. 2A. Further, when the block matching method is applied, the edge disparity image illustrated in FIG. 2C is derived based on the reference image of FIG. 2A. As can be understood by comparing the ovals enclosed by the broken lines in FIGS. 2B and 2C, the high density disparity image can express detailed information of an object having weak texture such as a road surface compared to the edge disparity image, and thereby a more detailed range-finding can be conducted based on the high density disparity image.

SGM does not derive a disparity value right after calculating the cost (e.g., dissimilarity), but SGM derives a disparity value by calculating the cost and then calculating a synthesis cost (i.e., synthesized dissimilarity), in which a disparity image (e.g., high density disparity image) expressing disparity values for almost all of the pixels is finally derived.

The block matching method calculates the cost same as SGM does. However, the block matching method does not calculate the synthesis cost, but derives disparity values only at areas having relatively strong texture such as edges in a captured image. Further, the method of deriving disparity values can be also the method of producing disparity values.

(Calculation of Cost)

Figure 3A:
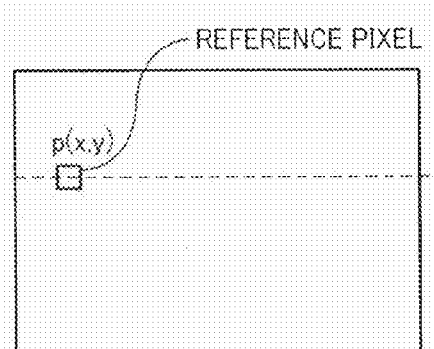
FIG. 3A is a conceptual diagram illustrating a reference pixel in a reference image.
Figure 3B:
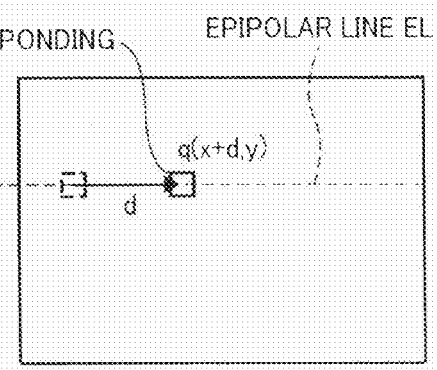
FIG. 3B is a conceptual diagram for explaining calculating cost by successively shifting candidate corresponding pixels in a comparison image relative to the reference pixel shown in FIG. 3A.
Figure 4:
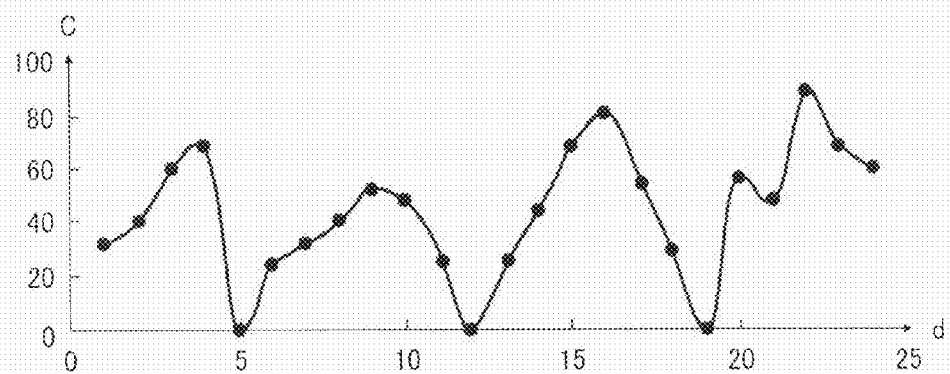
FIG. 4 is a graph of a cost profile plotting costs with respect to shift values.

Referring to FIGS. 3 and 4, a description is given of a method of calculating the cost C(p,d). FIG. 3A is a conceptual diagram illustrating a reference pixel in a reference image, and FIG. 3B is a conceptual diagram for explaining calculating the cost by successively shifting candidate corresponding pixels in a comparison image relative to the reference pixel shown in FIG. 3A. FIG. 4 is a graph of a cost profile plotting costs with respect to shift values. In this configuration, the corresponding pixel is a pixel in the comparison image that is the most similar, for example, in luminance value to the reference pixel in the reference image. In the following description, it is assumed that C(p,d) is equivalent to C(x,y,d), as p represents (x, y).

As illustrated in FIG. 3A, a reference pixel p(x,y) is set in the reference image. As illustrated in FIG. 3B, a plurality of candidate corresponding pixels q(x+d,y) that may correspond to the reference pixel p(x,y) are set on the epipolar line EL in the comparison image, wherein the epipolar line EL is set in the reference image and the comparison image as illustrated in FIGS. 3A and 3B. Based on luminance of the reference pixel p(x,y) and luminance of the plurality of candidate corresponding pixels q(x+d,y), the cost C(p,d) of each of the candidate corresponding pixels q(x+d,y) with respect to the reference pixel p(x,y) is calculated. In this description, "d" corresponds to a shift value of each of the candidate corresponding pixels "q" with respect to the reference pixel "p," and the shift value "d" is expressed, for example, in units of pixels. That is, in the example case of FIG. 3 (FIGS. 3A and 3B), the cost C(p,d), which indicates a level of dissimilarity between luminance of the candidate corresponding pixels q(x+d,y) and luminance of the reference pixel p(x,y), is calculated by successively shifting the candidate corresponding pixels q(x+d,y) one pixel by one pixel in a pre-set range or region (e.g., 0<d<25). The cost C can be calculated by applying any known method such as SAD (Sum of Absolute Difference) when the cost C represents a level of dissimilarity.

As illustrated in the graph of FIG. 4, the calculated costs C(p,d) can be expressed as a cost profile by plotting the calculated costs C with respect to the shift values "d." In the graph of FIG. 4, since the cost C becomes zero (0) at the shift values d=5, 12, 19, the minimum value of the cost C cannot be identified from the graph of FIG. 4. Therefore, in a case of an object having weak texture, it is difficult to identify the minimum value of the cost C.

(Calculation of Synthesis Cost)

Figure 5:
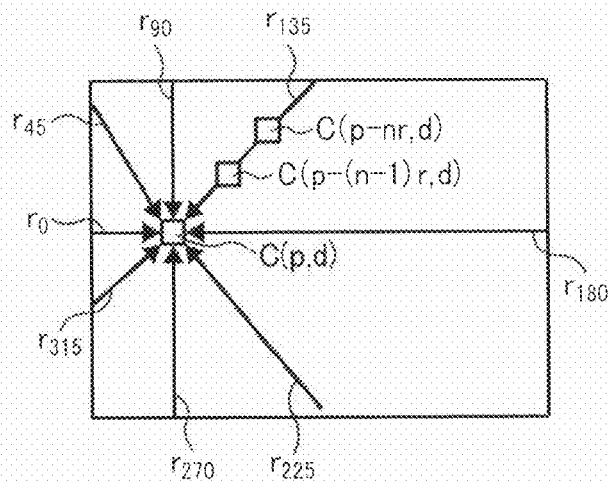
FIG. 5 is a conceptual diagram for explaining deriving a synthesis cost.
Figure 6:
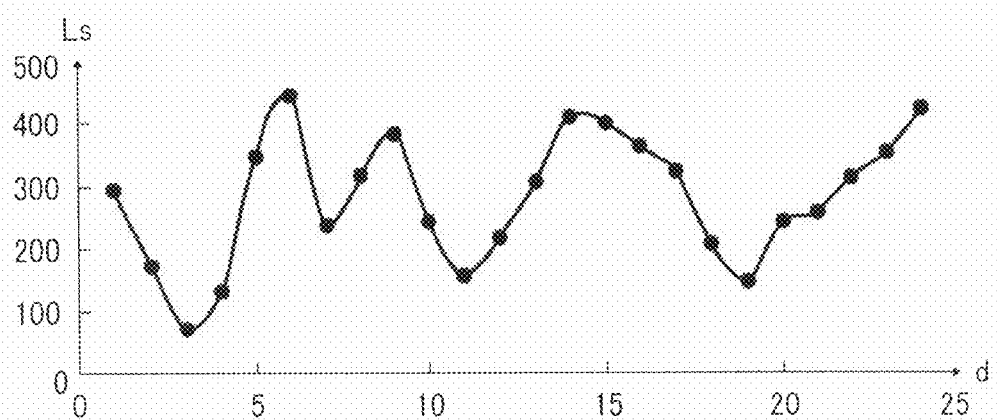
FIG. 6 is a graph of a synthesis cost profile plotting synthesis costs with respect to disparity values.

Referring to FIGS. 5 and 6, a description is given of a method of calculating a synthesis cost Ls(p,d). FIG. 5 is a conceptual diagram for describing calculation of the synthesis cost Ls. FIG. 6 is a graph of a synthesis cost profile plotting synthesis costs with respect to disparity values. The synthesis cost Ls(p,d) is obtained by calculating the cost C(p,d) for one reference pixel p(x,y), by calculating cost C for other pixels p'(x',y') used as other reference pixels existing at positions surrounding the one reference pixel p(x,y) such as from near to far positions with respect to the reference pixel p(x,y), and by aggregating or converging the cost C(p,d) for the one reference pixel p(x,y) and the costs C for other reference pixels p'(x',y') as the synthesis cost Ls(p,d).

A description is given of a method of calculating the synthesis cost Ls(p,d) in detail. To calculate the synthesis cost Ls(p,d), at first, it is necessary to calculate a directional path cost Lr(p,d). Equation (3) is used for calculating the directional path cost Lr(p,d), and equation (4) is used for calculating the synthesis cost Ls.

$$Lr(p,d) = C(p,d) + \min\{(Lr(p-r,d), Lr(p-r,d-1) + P1, Lr(p-r,d+1) + P1, Lr\min(p-r) + P2\} \quad (3)$$

In the equation (3), "r" indicates a direction vector along the aggregated direction having two directional components such as the x direction component and the y direction component. The term min { } is a function for obtaining the minimum value. Lrmin(p−r) indicates the minimum value of Lr(p−r,d) when the shift value "d" is changed in the coordinates where "p" is shifted by one pixel in "r" direction. It should be noted that Lr is recurrently applied as expressed in the equation (3). P1 and P2 are fixed parameters that can be set by experiments in advance such that the disparity values Δ of adjacent reference pixels on the direction path are likely to be continuous. For example, P1=48 and P2=96.

As expressed in the equation (3), Lr(p,d) for the reference pixel p(x,y) can be obtained by adding the minimum value of the directional path cost Lr of pixels existing along "r" direction from the reference pixel p(x,y) illustrated in FIG. 5 to the cost C of the reference pixel p(x,y). As described above, Lr is obtained for each one of pixels existing along "r" direction one by one starting from the farthest end pixel, which is the farthest from the reference pixel p(x,y). Based on the Lr obtained for the pixels existing along "r" direction, the Lr(p,d) of the pixel p(x,y) along "r" direction can be obtained.

Then, a plurality of directional path costs Lr can be obtained along a plurality of directions. For example, as illustrated in FIG. 5, a plurality of directional path costs such as $Lr_0, Lr_{45}, Lr_{90}, Lr_{135}, Lr_{180}, Lr_{225}, Lr_{270}, Lr_{315}$ is obtained in eight directions, Then, the synthesis cost Ls is finally obtained by applying the equation (4) to the plurality of directional path costs Lr.

$$L_S(p, d) = \sum_8 Lr \quad (4)$$

The calculated synthesis costs Ls(p,d) can be expressed as a graph of a synthesis cost profile by plotting the synthesis costs Ls(p,d) with respect to the shift values "d" as illustrated in FIG. 6. In the example case of FIG. 6, the synthesis cost Ls becomes the minimum value or the smallest value when the shift value d=3, and thereby the disparity value Δ is derived as Δ=3. Although "r" is set to eight in the above description, "r" is not limited hereto. For example, the eight directions can be further divided into sixteen directions (two times of eight directions), twenty four directions (three times of eight directions), and so on.

In the above description, the synthesis cost Ls is calculated by applying the equation (4) that totals the directional path costs Lr for all of the directional paths "r" calculated by the equation (3), but the synthesis cost Ls is not limited hereto. For example, the directional path cost Lr in a single directional path can be used as the synthesis cost Ls, or the directional path costs Lr in two or more directional paths can be synthesized as the synthesis cost Ls.

Although the cost C is used as an indicator of "dissimilarity" in the above description, the cost C can be used as an indicator of "similarity" that is the opposite of "dissimilarity." When the cost C is used as an indicator of similarity, a known method such as Normalized Cross Correlation (NCC) can be used as the method of calculating the cost C, in which the disparity value Δ at which the synthesis cost Ls becomes the "maximum" is derived instead of using the disparity value Δ at which the synthesis cost Ls becomes the "minimum." In this description, the similarity and dissimilarity may be collectively referred to as "matching level" of the cost. The synthesis cost can be referred to aggregation cost, and the process of synthesizing costs can be referred to the process of aggregating costs.

(Description of Example Embodiments)

A description is given of a specific configuration of one or more example embodiments with reference to the drawings, in which an object recognition system 1 mounted on a vehicle such as an automobile is described as one example. Other than automobiles, the object recognition system 1 is mountable on vehicles such as motor bicycles, bicycles, wheelchairs, agricultural tractors, construction machines, or the like. Further, the object recognition system 1 is mountable on vehicles, which is an example of movable apparatuses, and also on robots, which is another example of movable apparatuses. The robots are not limited to the movable apparatuses but can be fixed apparatuses such as industrial robots fixed at a given place such as robots for factory automation (FA). Further, the fixed apparatuses may not be limited to the robots, but can be other apparatuses such as security monitoring cameras or the like.

(Configuration of Example Embodiment)

Figure 7A:
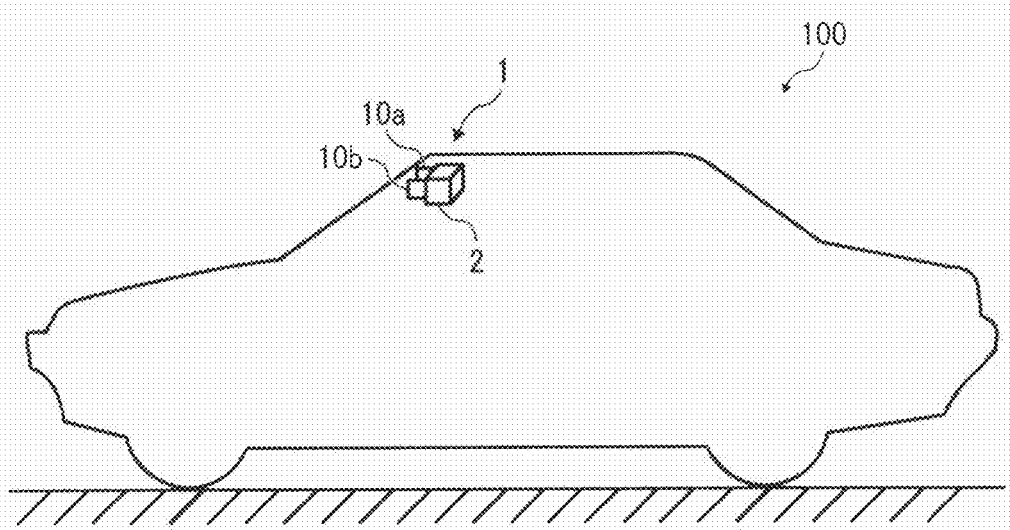
FIG. 7A is a schematic side view of a vehicle mounting an object recognition system according to one or more example embodiments.
Figure 7B:
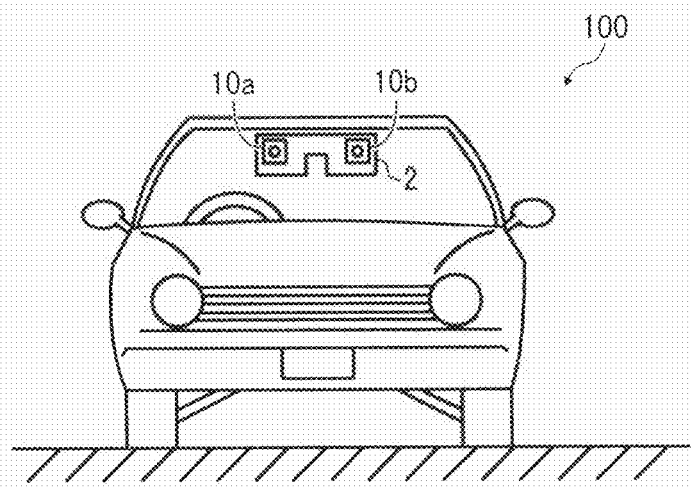
FIG. 7B is a schematic front view of the vehicle of FIG. 7A.
Figure 8:
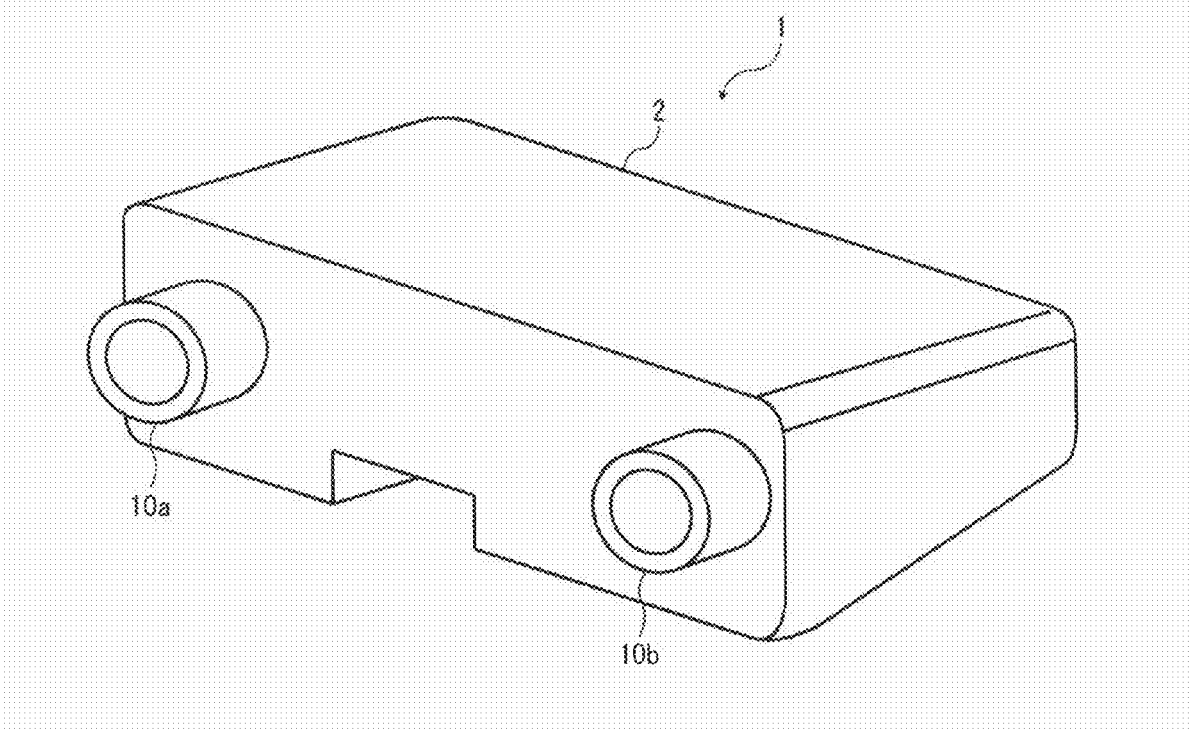
FIG. 8 is a schematic perspective view of the object recognition system of FIG. 7A.
Figure 9:
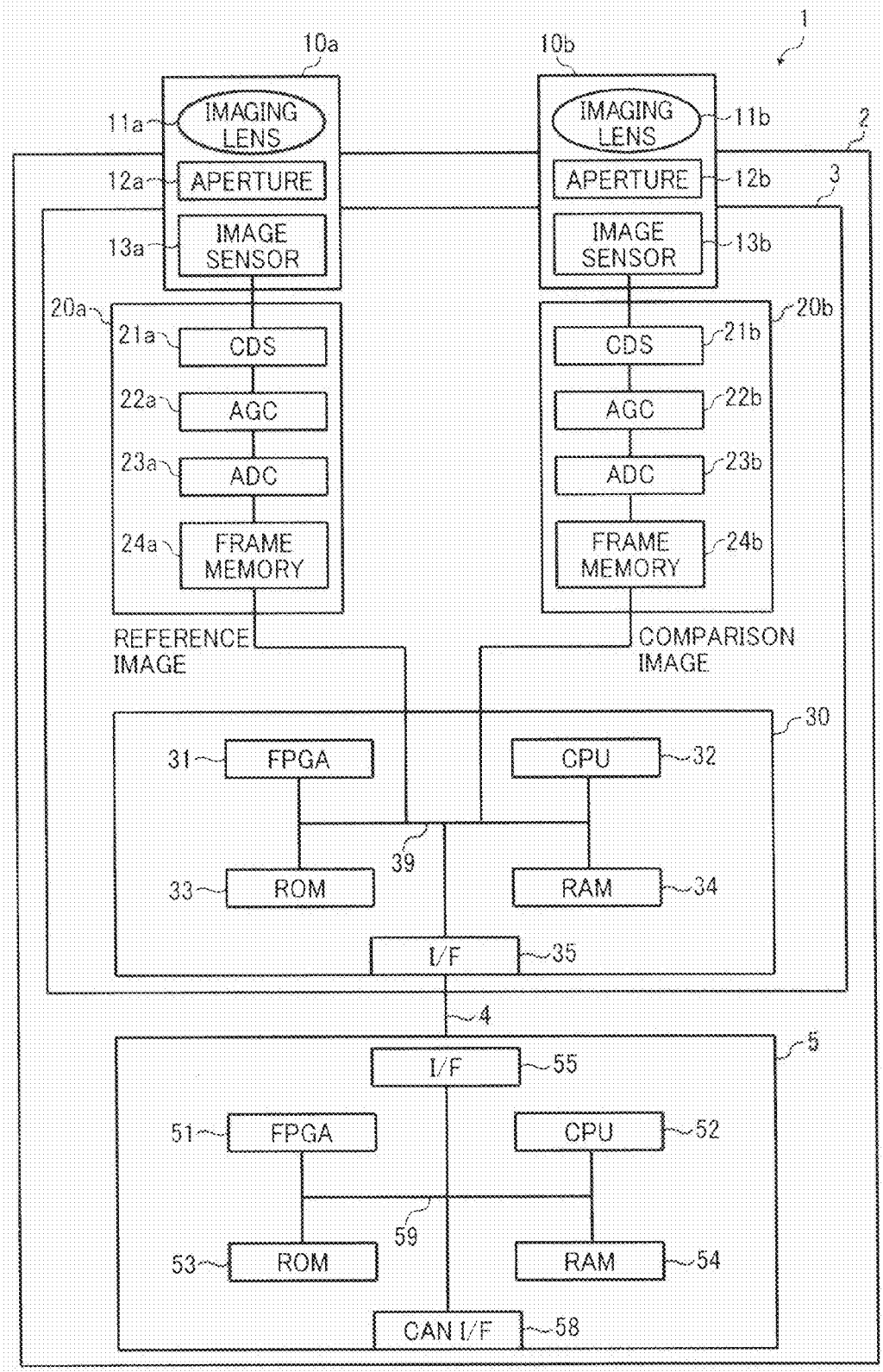
FIG. 9 is a block diagram example of hardware configuration of the object recognition system of FIG. 7.

A description is given of a configuration of the object recognition system 1 according to one or more example embodiments with reference to FIGS. 7 to 9.

(External Configuration)

With reference to FIGS. 7 and 8, a description is given of an external configuration of the object recognition system 1. FIG. 7A is a schematic side view of a vehicle 100 such as an automobile mounting the object recognition system 1, and FIG. 7B is a schematic front view of the vehicle 100 of FIG. 7A. FIG. 8 is a schematic perspective view of the object recognition system 1.

As illustrated in FIGS. 7A and 7B, the object recognition system 1 includes, for example, an imaging device 10a and an imaging device 10b. The imaging device 10a and the imaging device 10b can be disposed at least at one position to capture images of scenes ahead of the vehicle 100.

Further, as illustrated in FIG. 8, the object recognition system 1 includes, for example, a main body 2 and a pair of the imaging device 10a and imaging device 10b, shaped into a cylindrical shape, provided on the main body 2. Although the object recognition system 1 is disposed at the position shown in FIG. 7, the position to dispose the object recognition system 1 is not limited hereto. The object recognition system 1 can be disposed at any position on the apparatus depending on fields of application of the apparatus.

(Overall Hardware Configuration)

Referring to FIG. 9, a description is given of an overall hardware configuration of the object recognition system 1. FIG. 9 is a block diagram example of a hardware configuration of the object recognition system 1.

As illustrated in FIG. 9, the object recognition system 1 includes, for example, a disparity deriving apparatus 3, and an object recognition apparatus 5 in the main body 2. The disparity deriving apparatus 3 derives a disparity value Δ indicating disparity of the object E based on a plurality of images obtained by imaging the object E, and outputs a high density disparity image indicating the disparity value Δ for each pixel in the images. The object recognition apparatus 5 performs processing such as range-finding between the imaging devices 10a/10b and the object E based on a high density disparity image output from the disparity deriving apparatus 3.

A description is given of a hardware configuration of the disparity deriving apparatus 3. As illustrated in FIG. 9, the disparity deriving apparatus 3 includes, for example, the imaging device 10a, the imaging device 10b, a signal conversion device 20a, a signal conversion device 20b, and an image processing device 30.

The imaging device 10a includes, for example, an imaging lens 11a, an aperture 12a, and an image sensor 13a to generate an analog signal for reproducing an image by capturing images of scenes ahead of the vehicle 100 (FIG. 7). The imaging lens 11a is an optical element for diffracting light passing through the imaging lens 11a to form an image of an object on the image sensor 13a. The aperture 12a cuts off a part of the light passing through the imaging lens 11a to adjust the quantity of light input to the image sensor 13a to be described later. The image sensor 13a is, for example, a semiconductor device that converts the light input from the imaging lens 11a and the aperture 12a into an electrical analog image signal, and can be implemented, for example, as a charge coupled device (CCD) or a complementary metal oxide semiconductor (CMOS). The imaging device 10b has the same configuration as the imaging device 10a, and thereby a description of the imaging device 10b is omitted. The imaging lens 11a and the imaging lens 11b are installed such that their respective lens faces are on the same plane.

The signal conversion device 20a includes, for example, a correlated double sampling (CDS) 21a, an auto gain control (AGC) 22a, an analog digital converter (ADC) 23a, and a frame memory 24a to convert the analog signal for reproducing the captured image into image data in digital format. The CDS 21a removes noise from the analog image signal converted by the image sensor 13a by conducting correlated double sampling. The AGC 22a performs gain control for controlling the intensity of the analog image signal removed with the noise by the CDS 21a. The ADC 23a converts the analog image signal, gain-controlled by the AGC 22a, into image data in digital format. The frame memory 24a stores the image data converted by the ADC 23a.

Similarly, the signal conversion device 20b includes a CDS 21b, an AGC 22b, an ADC 23b, and a frame memory 24b to convert the analog image signal input from the imaging device 10b. The CDS 21b, AGC 22b, ADC 23b, and frame memory 24b respectively have the same configuration as the CDS 21a, AGC 22a, ADC 23a, and frame memory 24a, and thereby a description thereof is omitted.

Further, the image processing device 30 is a device for processing the image data converted by the signal conversion device 20a and the signal conversion device 20b. The image processing device 30 includes, for example, a field programmable gate array (FPGA) 31, a central processing unit (CPU) 32, a read only memory (ROM) 33, a random access memory (RAM) 34, an interface (I/F) 35, and a bus line 39 such as an address bus and a data bus for electrically connecting the components 31 to 35 as illustrated in FIG. 9.

The FPGA 31 is an integrated circuit that performs the process of calculating a disparity value Δ in the image represented by image data based on an instruction from the CPU 32. The CPU 32 controls entire operation performed by the disparity deriving apparatus 3. The ROM 33 stores an image processing program executable by the CPU 32 to control entire operation performed by the disparity deriving apparatus 3. The RAM 34 is used as a working area for the CPU 32. The I/F 35 is an interface for communicating with an I/F 55 of the object recognition apparatus 5, to be described later, through the bus line 4 such as an address bus and a data bus.

A description is given of a hardware configuration of the object recognition apparatus 5. As illustrated in FIG. 9, the object recognition apparatus 5 includes, for example, an FPGA 51, a CPU 52, a ROM 53, a RAM 54, an I/F 55, a controller area network (CAN) I/F 58, and a bus line 59 such as an address bus and a data bus for electrically connecting the components 51 to 55 and 58 as illustrated in FIG. 9.

The FPGA 51, CPU 52, ROM 53, RAM 54, I/F 55, and bus line 59 respectively have the same configuration as the FPGA 31, CPU 32, ROM 33, RAM 34, I/F 35, and bus line 39 in the image processing device 30, and thereby a description thereof is omitted. The I/F 55 is an interface for communicating with the I/F 35 of the image processing device 30 through the bus line 4. The ROM 53 stores an object recognition program executable by the CPU 52 to control entire operation performed by the object recognition apparatus 5. The CAN I/F 58 is an interface for communicating with an external controller or the like, and can be connected to, for example, a controller area network (CAN) of automobiles.

In the above described configuration, when a high density disparity image is transmitted from the I/F 35 of the image processing device 30 to the object recognition apparatus 5 through the bus line 4, the FPGA 51 calculates the distance Z between the imaging devices 10$a$/10$b$ and the object E based on an instruction from the CPU 52 in the object recognition apparatus 5. Further, the FPGA 31 can calculate the distance Z under an instruction from the CPU 32 of the image processing device 30 instead of calculating the distance Z by the FPGA 51 under an instruction from the CPU 52 in the object recognition apparatus 5.

Further, as to the above described example embodiment, the two imaging devices 10$a$ and 10$b$ are used but not limited hereto. For example, one imaging device can be used, in which an imaging area is separated into two areas on one image sensor to capture the reference image and the comparison image of the object E. Further, the above described programs may be stored in a computer-readable storage medium or carrier medium with an installable or executable file format for distribution of programs. The storage medium or carrier medium is, for example, a compact disc read only memory (CD-ROM), a secure digital (SD) memory card or the like, but not limited thereto.

(Hardware Configuration of Main Part)

Figure 10:
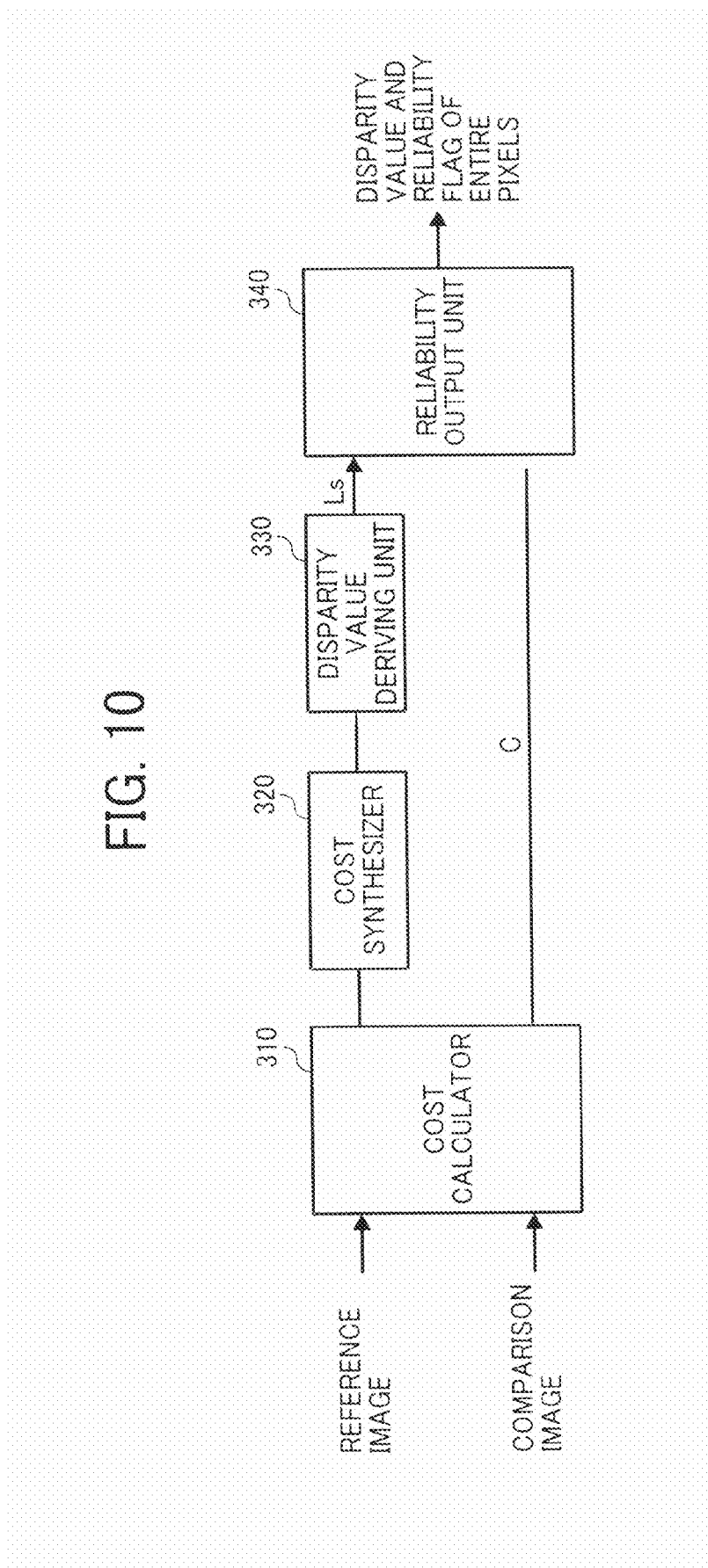
FIG. 10 is a schematic diagram illustrating a hardware configuration of a main part of a disparity deriving apparatus.

Referring to FIGS. 3, 9 and 10, a description is given of a hardware configuration of a main part of the disparity deriving apparatus 3. FIG. 10 is a schematic hardware configuration of the main part of the disparity deriving apparatus 3, which corresponds to functional units of the FPGA 31 (FIG. 9).

As illustrated in FIG. 10, the FPGA 31 (FIG. 9) includes, for example, a cost calculator 310 as a calculator, a cost synthesizer 320 as a synthesizer, a disparity value deriving unit 330 as a deriving unit, and a reliability output unit 340 as an output unit. In this example, it is assumed that these functional units are a part of the circuitry of the FPGA 31. Alternatively, any one of these functional units may be implemented in the form of instructions of the CPU 32 that are generated by executing the above-mentioned program read from any desired memory onto the working area for the CPU 32.

As illustrated in FIG. 3, the cost calculator 310 calculates and outputs the costs C of candidate corresponding pixels q(x+d,y) in the comparison image (FIG. 3B) with respect to a corresponding reference pixel p(x,y) in a reference image (FIG. 3A). Specifically, the cost calculator 310 calculates and outputs the costs C of the candidate corresponding pixels q(x+d,y) in the comparison image, which may correspond to the reference pixel p(x,y) in the reference image, based on a difference of luminance of the reference pixel p(x,y) in the reference image and luminance of the candidate corresponding pixels q(x+d,y) in the comparison image by shifting positions of the candidate corresponding pixels, identified by corresponding shift values d, on the epipolar line EL extended from the reference pixel p(x,y) in the reference image to the comparison image. Further, the cost calculator 310 can be configured to retain or store each of the calculated costs C in a memory.

For each of the shift values "d," the cost synthesizer 320 synthesizes the costs C of candidate corresponding pixels q(x+d,y) corresponding to one reference pixel p(x,y) output by the cost calculator 310, and the costs C of candidate corresponding pixels q'(x'+d,y') corresponding to other reference pixel p'(x',y') output by the cost calculator 310, and outputs the synthesized costs as the synthesis cost Ls. This synthesizing process is a process of calculating the directional path costs Lr based on the costs C using the equation (3), and then adding the directional path costs Lr for each of the directions using the equation (4) to calculate the synthesis cost Ls.

Further, the disparity value deriving unit 330 derives the shift value "d" corresponding to the smallest synthesis cost Ls, output by the cost synthesizer 320, as the disparity value Δ.

Further, the reliability output unit 340 acquires each one of the costs C retained or stored in the cost calculator 310, and derives a specific cost C(p,Δ) having a shift value, which is equal to the shift value "d" of the cost C corresponding to the smallest synthesis cost Ls, from among the acquired costs C. Further, the reliability output unit 34 determines whether the specific cost C(p,Δ) is less than a given first threshold Th1 (e.g., C=60). If the specific cost C (p, Δ) is less than the threshold Th1, the reliability output unit 340 assigns or correlates a reliability flag F of "1" (F=1) to a disparity value Δ derived by the disparity value deriving unit 330. By contrast, if the specific cost C(p,Δ) is the first threshold Th1 or more, the reliability output unit 340 assigns or correlates a reliability flag F of "0" (F=0) to a disparity value Δ derived by the disparity value deriving unit 330. The reliability flag F=1 means that reliability of the disparity value Δ derived by the disparity value deriving unit 330 is high, and the reliability flag F=0 means that reliability of the disparity value Δ derived by the disparity value deriving unit 330 is low. The reliability output unit 340 can change the threshold by a user operation, for example according to the user preference.

(Operation of Example Embodiment)

Referring to FIGS. 11 to 15, an operation according to one or more example embodiments is described. Specifically, a method of deriving the disparity value Δ is described with reference to FIG. 11, which is a flowchart illustrating operation of disparity computation according to one example embodiment.

At first, the imaging device 10$a$ (FIG. 9) generates analog image data by capturing an image of the object E (step S1-1). Similarly, the imaging device 10$b$ generates analog image data by capturing an image of the object E (step S1-2).

Then, the signal conversion device 20$a$ converts the analog image data into digital image data (step S2-1). Similarly, the signal conversion device 20$b$ converts the analog image data into digital image data (step S2-2).

Then, the signal conversion device 20$a$ outputs the digital image data, converted at step S2-1, to the FPGA 31 of the image processing device 30 as data of a reference image (step S3-1), wherein an example of the reference image is shown in FIG. 2A. Similarly, the signal conversion device 20$b$ outputs the digital image data, converted at step S2-2, to the FPGA 31 of the image processing device 30 as data of a comparison image (step S3-2). Since the comparison image, which is the image captured by the imaging device 10$b$, has no significant difference from the reference image shown in FIG. 2A, an example view of the comparison image is omitted.

Figure 12A:
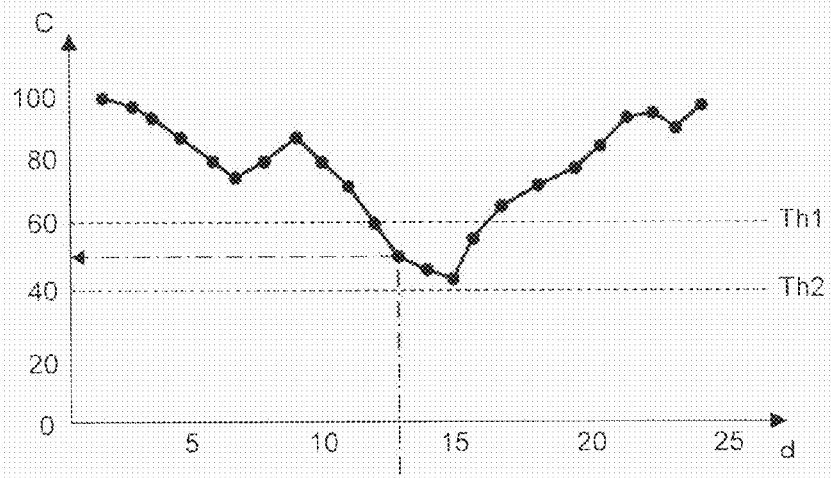
FIG. 12A is a graph plotting costs with respect to shift values.

Then, the cost calculator 310 (FIG. 10) calculates the costs C for each one of the shift values "d" based on the data of the reference image and the data of the comparison image as expressed by the graph of FIG. 12A (step S4). FIG. 12A is a graph plotting the costs C of each of the shift values "d," in which the cost C becomes the minimum or smallest value when the shift value is 15 (i.e., d=15).

Figure 12B:
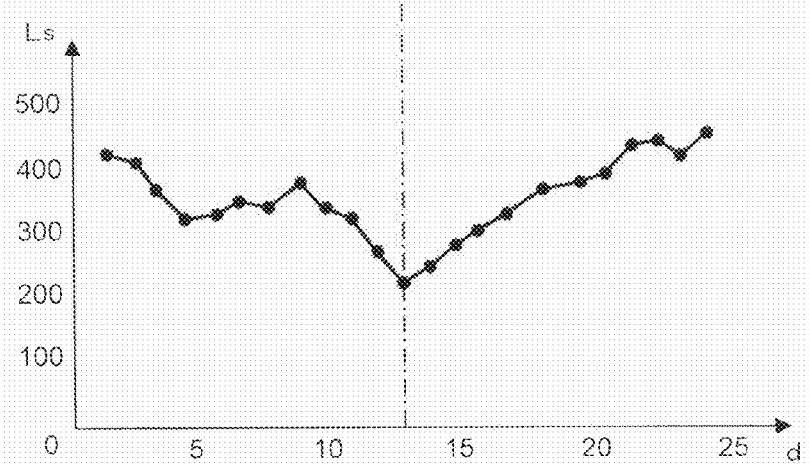
FIG. 12B is a graph plotting synthesis costs with respect to shift values.
Figure 13:
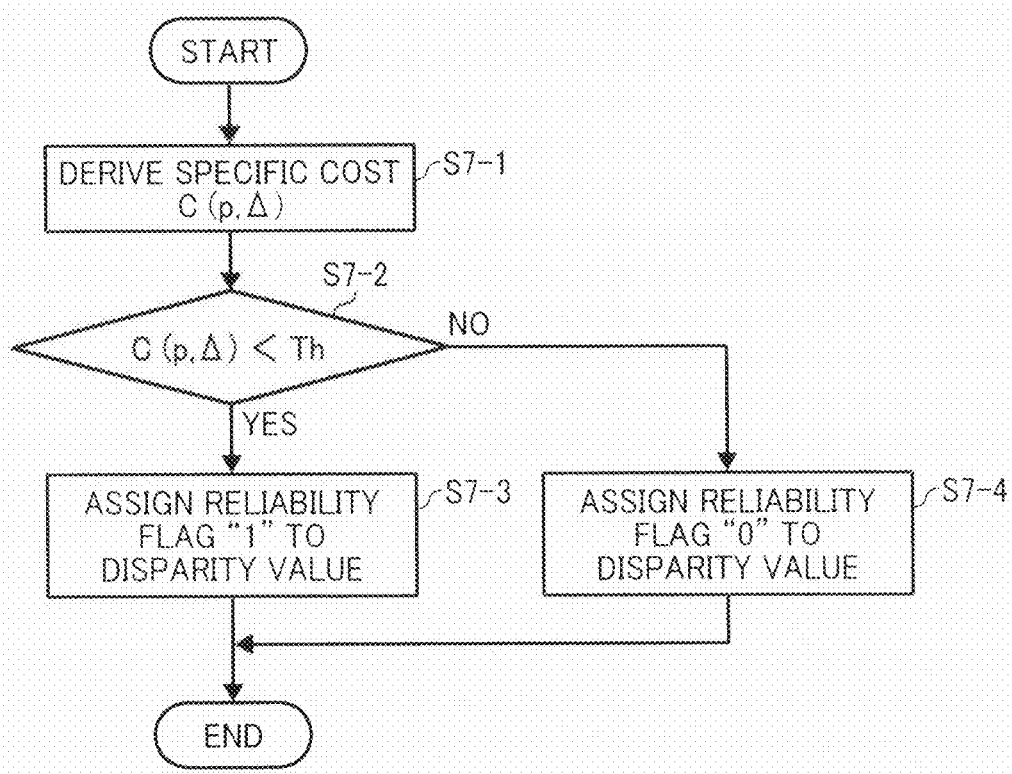
FIG. 13 is a flowchart illustrating operation of assigning a reliability flag.
Figure 15C:
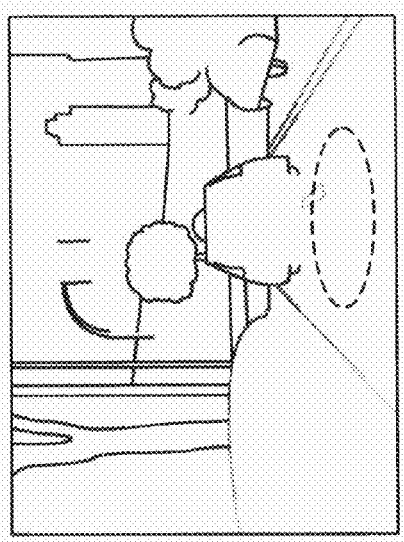
FIG. 15C is an example of a low density disparity image generated by using costs less than a second threshold.

Then, the cost synthesizer 320 (FIG. 10) generates and outputs the synthesis costs Ls for each one of the shift values "d" as expressed by the graph of FIG. 12B (step S5). FIG. 12B is a graph plotting the synthesis costs Ls for each one of the shift values d, in which the synthesis cost Ls becomes the minimum or smallest value when the shift value is 13 (i.e., d=13). Then, the disparity value deriving unit 330 outputs the shift value "d" when the synthesis cost Ls, output by the cost synthesizer 320, becomes the minimum value as the disparity value Δ (step S6). In this case, since the shift value d=13 gives the smallest synthesis cost Ls, the disparity value deriving unit 330 outputs the disparity value Δ=13, and the high density disparity image illustrated in FIG. 15A is generated Then, the reliability output unit 340 assigns a reliability flag F of "1" or "0" to the disparity value Δ (step S7). A description is given of a process of assigning the reliability flag F at step S7 with reference to FIGS. 12 and 13. FIG. 13 is a flowchart illustrating operation of assigning the reliability flag F.

As illustrated in FIG. 13, the reliability output unit 340 derives a specific cost C(p,Δ) having a shift value, which is equal to the shift value "d" of the cost C corresponding to the smallest synthesis cost Ls, from among the costs C acquired from the cost calculator 310 (step S7-1). In the example case of FIG. 12, as illustrated in FIG. 12B, the shift value "d" corresponding to the smallest synthesis cost Ls is 13 (i.e., d=13). Therefore, as illustrated in FIG. 12A, the specific cost having the same shift value of d=13 becomes the specific cost C(p,Δ) of 50 (i.e., C(p,Δ)=50).

Then, the reliability output unit 340 determines whether the specific cost C(p,Δ) is less than a given first threshold Th1 (step S7-2). If the specific cost C(p,Δ) is less than the first threshold Th1 (step S7-2: Yes), the reliability output unit 340 assigns the reliability flag F of "1" (F=1) to the disparity value Δ derived by the disparity value deriving unit 330 (step S7-3). By contrast, if the specific cost C(p, Δ) is the first threshold Th1 or more (step S7-2: No), the reliability output unit 340 assigns the reliability flag F of "0" (F=0) to the disparity value Δ derived by the disparity value deriving unit 330 (step S7-4).

Figure 14:
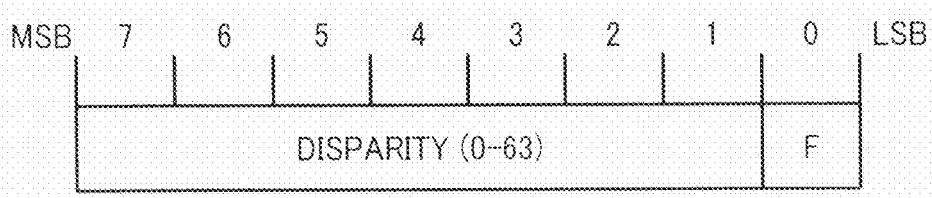
FIG. 14 is an example of a data structure composed of disparity value and reliability flag for each pixel.

A description is given of a concept of the disparity value Δ assigned with the reliability flag F with reference to FIG. 14. In the example case of FIG. 12, since the specific cost C(p,Δ)=50 is less than the first threshold Th1=60, the reliability flag F=1 is assigned to the disparity value Δ.

FIG. 14 is an example of a data structure composed of disparity and reliability flag for each pixel. As illustrated in FIG. 14, data of the disparity value Δ of each pixel is expressed in binary form, in which one bit is used for the reliability flag F (1 or 0), and seven bits are used for the disparity value Δ (e.g., 0-63).

The disparity values Δ of all the pixels, assigned with the reliability flag F by the above described process, are transmitted to an external apparatus such as the object recognition apparatus 5 through the I/F 35 illustrated in FIG. 9. Then, the disparity values Δ of all the pixels assigned with the reliability flag F are processed by a CPU of the object recognition apparatus 5 (external apparatus) to classify pixels in the image of the object E and also to compute the distance Z between the imaging devices 10*a*/10*b* and the object E.

For example, the object recognition apparatus 5 can generate a high density disparity image as illustrated in FIG. 15A based on the disparity values Δ of all the pixels without using the reliability flag F. The high density disparity image can be used to classify the object E, such as whether the object E is an automobile or a road sign, and to compute the distance Z between the imaging lenses 11*a*/11*b* and the object E.

Figure 15B:
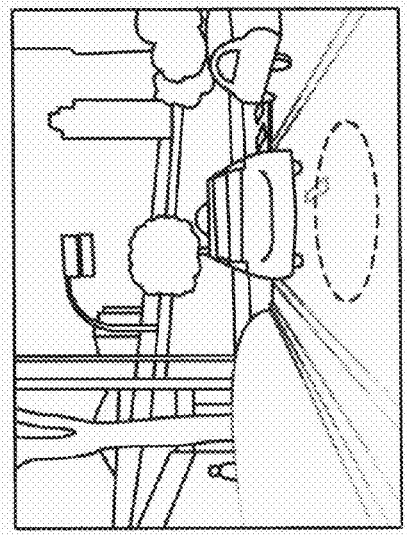
FIG. 15B is an example of a low density disparity image generated by using costs less than a first threshold.
Figure 15A:
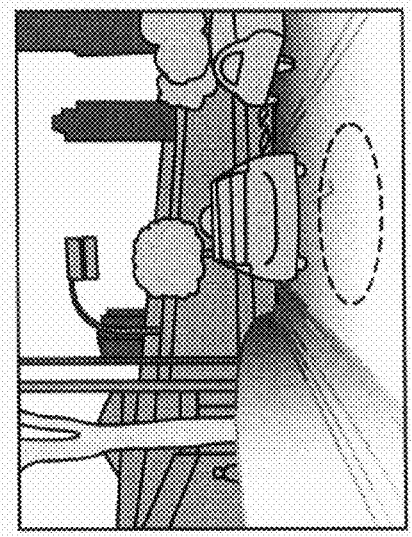
FIG. 15A is an example of a high density disparity image.

Further, the object recognition apparatus 5 can generate a low density disparity image as illustrated in FIG. 15B based on the disparity values Δ of all the pixels with using the reliability flag F. The low density disparity image can be used to compute the distance Z between the imaging lenses 11*a*/11*b* and the object E. The low density disparity image may not be effective for classifying the object E compared to the high density disparity image, but the low density disparity image is effective for the range-finding compared to the high density disparity image.

Further, when generating the images, the object recognition apparatus 5 generates a low density disparity image for pixels having the reliability flag F=0 without using the disparity value Δ by determining that the reliability at such pixels is low, and generates a low density disparity image for pixels having the reliability flag F=1 with using the disparity value Δ by determining that the reliability at such pixels is high. For example, since pixels corresponding to a strong edge such as a boundary between a road sign and sky are used for generating a disparity image, the low density disparity image becomes an image similar to the edge disparity image illustrated in FIG. 2C.

Further, if a second threshold Th2 (e.g., Th2=40), which is set lower than the first threshold T1, is applied in the example case of FIG. 12A, the object recognition apparatus 5 generates a low density disparity image as illustrated in FIG. 15C. Therefore, the lower the threshold, the smaller the number of pixels that can be used for obtaining disparity values as illustrated in the low density disparity image of FIG. 15C having fewer disparity-obtained pixels compared to the low density disparity image of FIG. 15B.

(Processing by Object Recognition Apparatus)

A description is given of processing by the object recognition apparatus 5 that has received disparity information output from the disparity deriving unit 3. For example, a description is given of a case that the object recognition system 1 processes movie images.

The disparity deriving unit 3 outputs disparity images composed of pixels assigned with the reliability flag F for each one of pixels, to the object recognition apparatus 5. Then, the object recognition apparatus 5 conducts the classification of objects (that is, to recognize object) using both of pixels assigned with the reliability flag F of "0" (F=0) and pixels assigned with the reliability flag F of "1" (F=1). Then, the object recognition apparatus 5 conducts the range-finding using only pixels assigned with the reliability flag F=1. With this configuration, both of the classification of objects and the range-finding of objects can be conducted with enhanced precision. In this configuration, conducting the classification of objects using both of the pixels assigned with the reliability flags F=0 and F=1 means that the classification of objects is conducted by conducting sub-processes (e.g., first sub-process, second sub-process) on the pixels assigned with the reliability flags F=0 and F=1. Conducting the range-finding using the pixels assigned with the reliability flag F=1 but not using the pixels assigned with the reliability flag F=0 means that the range-finding is conducted by conducting a third sub-process without using the pixels assigned with the reliability flag F=0. In this configuration, the first sub-process is, for example, a process of using pixels assigned with the reliability flag F=0, or conducting spatial filtering on pixels assigned with the reliability flag F=0. The second sub-process is, for example, a process of using pixels assigned with the reliability flag F=1, or conducting spatial filtering on pixels assigned with the reliability flag F=1. The third sub-process is, for example, a process that is conducted without using pixels assigned with the reliability flag F=0.

In the above described configuration, the disparity deriving unit 3 outputs disparity images with the reliability flag F to the object recognition apparatus 5, but the configuration is not limited hereto. For example, in another configuration, the disparity deriving unit 3 can output disparity images to the object recognition apparatus 5 without outputting the reliability flag F. In this case, the disparity deriving unit 3 outputs frames of the high density image (FIG. 15A) and frames of the low density disparity image (FIG. 15B) alternately. For example, the disparity deriving unit 3 outputs a high density disparity image using pixels assigned with the reliability flags F=1 and F=0 for the first frame, and the disparity deriving unit 3 outputs a low density disparity image using only pixels assigned with the reliability flag F=1 for the second frame. When the classification of objects is conducted using the first frame, and the range-finding is conducted using the second frame, both of the classification of objects and the range-finding can be conducted with enhanced precision. Further, as also in the above described configuration that the disparity deriving unit 3 outputs the disparity image with the reliability flag F to the object recognition apparatus 5, different processes can be conducted on each one of frames output from the disparity deriving unit 3. In this configuration described above, conducting the classification of objects using both of the pixels assigned with the reliability flags F=0 and F=1 means that the classification of objects is conducted by conducting sub-processes (e.g., first sub-process, second sub-process) on the pixels assigned with the reliability flags F=0 and F=1. Conducting the range-finding using the pixels assigned with the reliability flag F=1 but not using the pixels assigned with the reliability flag F=0 means that the range-finding is conducted by conducting a third sub-process on the pixels assigned with the reliability flag F=0, which is different from the sub-process applied to the pixels assigned with the reliability flag F=1.

The above-described operation of conducting different sub-processes based on information of the reliability flag may be performed in various other ways. For example, in another processing, the disparity deriving unit 3 outputs disparity images having each one of pixels assigned with the reliability flag F to the object recognition apparatus 5. The object recognition apparatus 5 conducts spatial filtering to both of pixels assigned with the reliability flags F=0 and F=1 to conduct the classification of objects, and furthermore, the object recognition apparatus 5 conducts spatial filtering to only pixels assigned with the reliability flag F=1 to conduct the range-finding.

In this configuration, the reliability flag of 0 (F=0) is an example of first determination information, and the reliability flag of 1 (F=1) is an example of second determination information. The disparity value based on pixel assigned with the reliability flag of 0 (F=0) is an example of a first disparity value, and the disparity value based on pixel assigned with the reliability flag of 1 (F=1) is an example of a second disparity value. The classification of object or object recognition is an example of a first process, and the range-finding is an example of a second process.

As to the above described one or more example embodiments, the disparity deriving apparatus 3 outputs the disparity value $\Delta$, and also the reliability flag F, which is assigned depending on the specific cost $C(p,\Delta)$, for each of pixels. By acquiring the disparity values $\Delta$ of all the pixels assigned with the reliability flag F, the object recognition apparatus 5 can generate not only a high density disparity image relatively suitable to the classification of objects, but also a low density disparity image relatively suitable to the range-finding. In this configuration, the disparity deriving apparatus 3 can output a greater amount of information to the object recognition apparatus 5 compared to configurations of conventional apparatuses.

(Additional Configuration of Example Embodiment)

As to the above described one or more example embodiments, the disparity deriving apparatus 3 outputs the disparity value $\Delta$ assigned with the reliability flag F to the object recognition apparatus 5, but not limited hereto. For example, the disparity deriving apparatus 3 can be configured to perform some of the functions of the object recognition apparatus 5, in which the disparity deriving apparatus 3 can generate a high density disparity image and/or a low density disparity image. Further, the disparity deriving apparatus 3 can output the disparity value $\Delta$ and the reliability flag F separately to the object recognition apparatus 5 by not assigning the reliability flag F to the disparity value $\Delta$, in which the header of data of the disparity value $\Delta$ and the header of data of reliability flag F are set with identifiers so that the disparity value $\Delta$ and the reliability flag F can be correlated with each other. Further, the reliability flag F is one example of reliability information, and the reliability information can be other data indicating high reliability and data indicating low reliability.

Further, as to the above described one or more example embodiments, the reliability output unit 340 assigns the reliability flag F to the disparity value $\Delta$ as illustrated in FIG. 14, but the data structure is not limited hereto. For example, instead of the reliability flag F, the reliability output unit 340 can assign a specific cost $C(p,\Delta)$ to the disparity value $\Delta$, In this case, if eight bits are required for expressing the specific cost $C(p,\Delta)$ having a range from 1 to 100, and seven bits are required for expressing the disparity value $\Delta$, fifteen bits are required as total. Further, the reliability output unit 340 can assign all of the costs C instead of assigning only the lowest or smallest cost C to the disparity value $\Delta$.

The above described example embodiments include at least following configurations.

(Configuration 1)

As to the above described example embodiments, a disparity deriving apparatus can derive disparity of an object using a reference image of the object captured by a first imaging device, and a comparison image of the object captured by a second imaging device, in which the disparity is indicated by a disparity value. The disparity deriving apparatus includes a calculator such as the cost calculator 310, a synthesizer such as the cost synthesizer 320, a deriving unit such as the disparity value deriving unit 330, and an output unit such as the reliability output unit 340. Further, the imaging device 10a is one example of the first imaging device, and the imaging device 10b is one example of the second imaging device.

The calculator calculates a cost C between the reference image and the comparison image by computing a difference of luminance of a reference area (e.g., pixel) in the reference image, and luminance of each one of candidate corresponding areas (e.g., pixel) in the comparison image, corresponding to the reference area, by shifting positions of the candidate corresponding areas on the epipolar line EL in the comparison image, wherein the epipolar line EL is extended from the reference area in the reference image, in which the positions of the candidate corresponding areas can be identified based on the corresponding shift value d, and the cost C represents a level of dissimilarity or a level of similarity between luminance of the reference area and luminance of the candidate corresponding areas.

The synthesizer synthesizes costs between a first reference area and each of candidate corresponding areas in the comparison image, corresponding to the first reference area in the reference image, wherein the costs are calculated by the calculator, and costs between a second reference area and each of candidate corresponding areas in the comparison image, corresponding to the second reference area surrounding the first reference area in the reference image, wherein the costs are calculated by the calculator, for each of the shift values as synthesis costs, and outputs each of the synthesis costs for each of the shift values.

The deriving unit derives a disparity value based on a shift value corresponding to the smallest synthesis cost when the cost represents the level of dissimilarity among the synthesis costs output by the synthesizer, or the deriving unit derives a disparity value based on a shift value corresponding to the largest synthesis cost when the cost represents the level of similarity among the synthesis costs output by the synthesizer.

The output unit selectively outputs a specific cost having a shift value equal to the shift value corresponding to the smallest synthesis cost when the cost represents dissimilarity among the costs calculated by the calculator, or the output unit selectively outputs a specific cost having a shift value equal to the shift value corresponding to the largest synthesis cost when the cost represents similarity among the costs calculated by the calculator.

(Configuration 2)

As to the disparity deriving apparatus of the above configuration 1, the output unit outputs a disparity value with a specific cost by correlating the disparity value and the specific cost when the cost represents dissimilarity, or the output unit outputs a disparity value with a specific cost by correlating the disparity value and the specific cost when the cost represent similarity.

(Configuration 3)

As to the disparity deriving apparatus of the above configuration 1, instead of outputting by the output unit of the above configuration 1, the output unit outputs reliability information indicating reliability of the disparity value based on the specific cost when the cost represents the level of dissimilarity or based on the specific cost when the cost represents similarity.

(Configuration 4)

As to the disparity deriving apparatus of the above configuration 3, the reliability information indicates high reliability when the cost represents the level of dissimilarity and the specific cost is less than a given threshold, or the reliability information indicates high reliability when the cost represents the level of similarity and the specific cost exceeds a given threshold.

(Configuration 5)

As to the disparity deriving apparatus of the above configurations 3 or 4, the reliability information is, for example, a flag indicating high reliability or a flag indicating low reliability.

(Configuration 6)

As to the disparity deriving apparatus of any one of above configurations 3 to 5, the output unit outputs the disparity value and the reliability information by correlating the disparity value and the reliability information.

As to the above described configuration of one or more example embodiments that the disparity value is output with the cost, the configuration can effectively conduct the classification of objects and also the range-finding of objects compared to conventional configurations that output only the disparity value.

The present invention can be implemented in any convenient form, for example using dedicated hardware, or a mixture of dedicated hardware and software. The computer software can be provided to the programmable device using any storage medium or carrier medium for storing processor-readable code such as a floppy disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The computer software can be provided from a transmitting apparatus, which transmits signals, via a transmission medium such as public phone line, dedicated line, or other communication line, in which a part of the computer software is transmitted on the transmission medium, which means it is not required to transmit the entire data of the computer software is being transmitted on the transmission medium at one time. The signals include data signals of the computer software and other data. The transmitting apparatus can transmit the computer software by transmitting data of the computer software continuously or intermittently.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps.

In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A disparity deriving apparatus for deriving disparity of an object based on a reference image of the object captured at a first image capturing position and a comparison image of the object captured at a second image capturing position, the disparity deriving apparatus comprising:
   processing circuitry configured to
      calculate costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image;
      synthesize the costs of the first reference area, and the costs of the second reference area as synthesis costs;
      derive a disparity value of the object captured in the first reference area based on the synthesis costs;
      determine, from the costs of the first reference area, a specific cost that is identified by the derived disparity value; and
      output the derived disparity value and the determined specific cost that is identified by the derived disparity value.

2. The disparity deriving apparatus of claim 1, wherein the processing circuitry is further configured to conduct binary processing to the determined specific cost by applying a threshold to obtain a binary reliability value, and output the derived disparity value together with the binary reliability value.

3. The disparity deriving apparatus of claim 2, wherein the given threshold is changeable.

4. The disparity deriving apparatus of claim 2, wherein the processing circuitry is further configured to assign "1" as the binary reliability value when the determined specific cost is less than the threshold and assign "0" as the binary reliability value when the determined specific cost is greater than or equal to the threshold.

5. A movable apparatus comprising the disparity deriving apparatus of claim 1.

6. The movable apparatus of claim 5, wherein the movable apparatus is one of a vehicle and a robot.

7. A robot comprising the disparity deriving apparatus of claim 1.

8. The robot of claim 7, wherein the robot is a fixed industrial robot.

9. The disparity deriving apparatus of claim 1, wherein the processing circuitry is further configured to derive the disparity value by finding a shift value corresponding to a minimum value of the synthesis costs, and use the shift value to find the determined specific cost, from among the costs of the first reference area, wherein the shift value corresponding to the minimum value of the synthesis costs need not be equal to a shift value corresponding to a minimum value of the costs of the first reference area.

10. A method of deriving disparity of an object based on a reference image of the object captured at a first image capturing position and a comparison image of the object captured at a second image capturing position, the method comprising:
   calculating costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image;
   synthesizing the costs of the first reference area, and the costs of the second reference area as synthesis costs;
   deriving a disparity value of the object captured in the first reference area based on the synthesis costs synthesized in the synthesizing step;
   determining, from the costs of the first reference area, a specific cost that is identified by the derived disparity value; and
   outputting the disparity value derived in the deriving step and the determined specific cost that is identified by the derived disparity value.

11. A non-transitory computer-readable storage medium storing a program that, when executed by a computer, causes the computer to execute the method of claim 10.

12. A disparity deriving apparatus for deriving disparity of an object based on a reference image of the object captured at a first image capturing position and a comparison image of the object captured at a second image capturing position, the disparity deriving apparatus comprising:
   processing circuitry configured to
      calculate a matching level between a first reference area in the reference image and each one of corresponding areas corresponding to the reference first area in a given region in the comparison image, and a matching level between a second reference area, surrounding the first reference area in the reference image, and each one of corresponding areas corresponding to the second reference area in a given region in the comparison image;
      synthesize the matching level of the first reference area, and the matching level of the second reference area as a synthesis matching level;

derive a disparity value of the object captured at the first reference area based on the synthesis matching level, and to assign, based on a specific value of the matching level of the first reference area corresponding to the derived disparity value, first determination information or second determination information to the derived disparity value; and output the derived disparity value to an object recognition apparatus that recognizes an object in the reference image or the comparison image by conducting a first process and a second process based on the derived disparity value, the first process including a first sub-process that processes a first disparity value determined by the first determination information, and a second sub-process that processes a second disparity value determined by the second determination information, and the second process including a third sub-process that processes the second disparity value.

13. The disparity deriving apparatus of claim 12, wherein the processing circuitry outputs the derived disparity value to the object recognition apparatus that conducts the first process using the first disparity value and the second disparity value, and conducts the second process using the second disparity value without using the first disparity value.

14. The disparity deriving apparatus of claim 13, wherein the first process is a process of object recognition classification of object, and the second process is a process of range-finding.

15. The disparity deriving apparatus of claim 12,
wherein the first process is a process of classification of object,
wherein the second process is a process of range-finding,
wherein the first determination information is a reliability flag of 0,
wherein the second determination information is a reliability flag of 1,
wherein the first disparity value is a pixel assigned with the reliability flag of 0,
wherein the second disparity value is a pixel assigned with the reliability flag of 1,
wherein the first sub-process is a process that uses the pixel assigned with the reliability flag of 0, or spatial filtering on the pixel assigned with the reliability flag of 0,
wherein the second sub-process is a process that uses the pixel assigned with the reliability flag of 1, or spatial filtering on the pixel assigned with the reliability flag of 1,
wherein the third sub-process is a process performed without using the pixel assigned with the reliability flag of 0.

* * * * *